Feb. 4, 1958  R. R. GROVER  2,821,870
MULTIPLE INDEXING MACHINE TOOL
Filed March 3, 1954  6 Sheets-Sheet 2
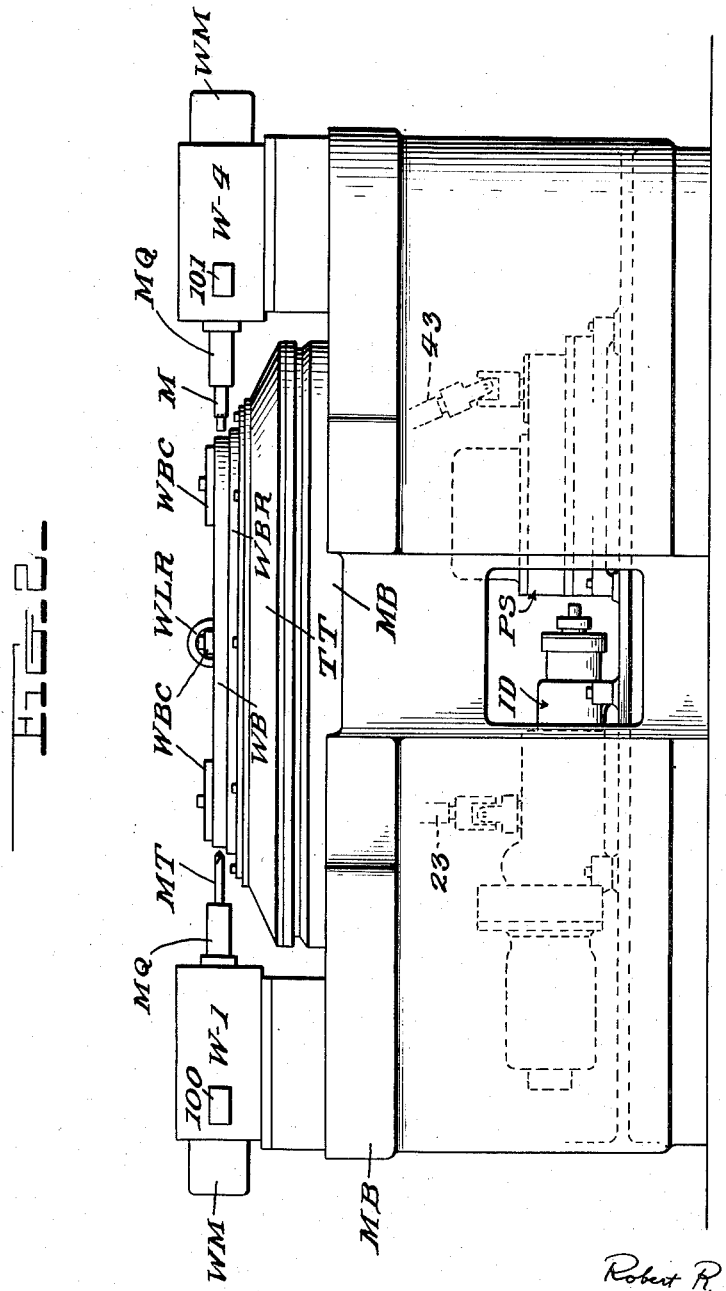
INVENTOR
Robert R. Grover,
BY Mason, Porter, Diller & Stewart,
ATTORNEYS Feb. 4, 1958 R. R. GROVER 2,821,870
MULTIPLE INDEXING MACHINE TOOL
Filed March 3, 1954 6 Sheets-Sheet 3
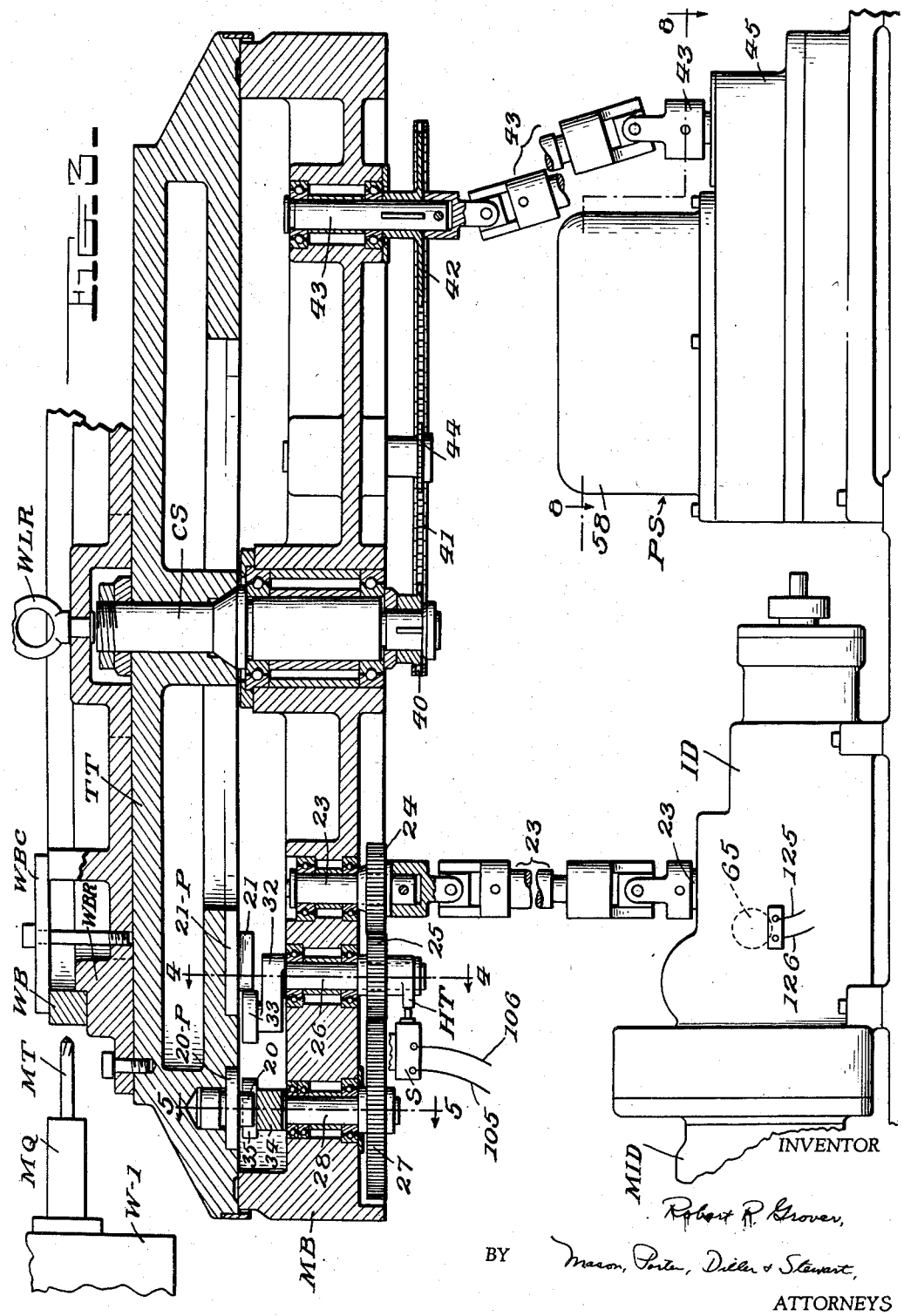
INVENTOR
Robert R. Grover,
BY Mason, Porter, Diller & Stewart
ATTORNEYS

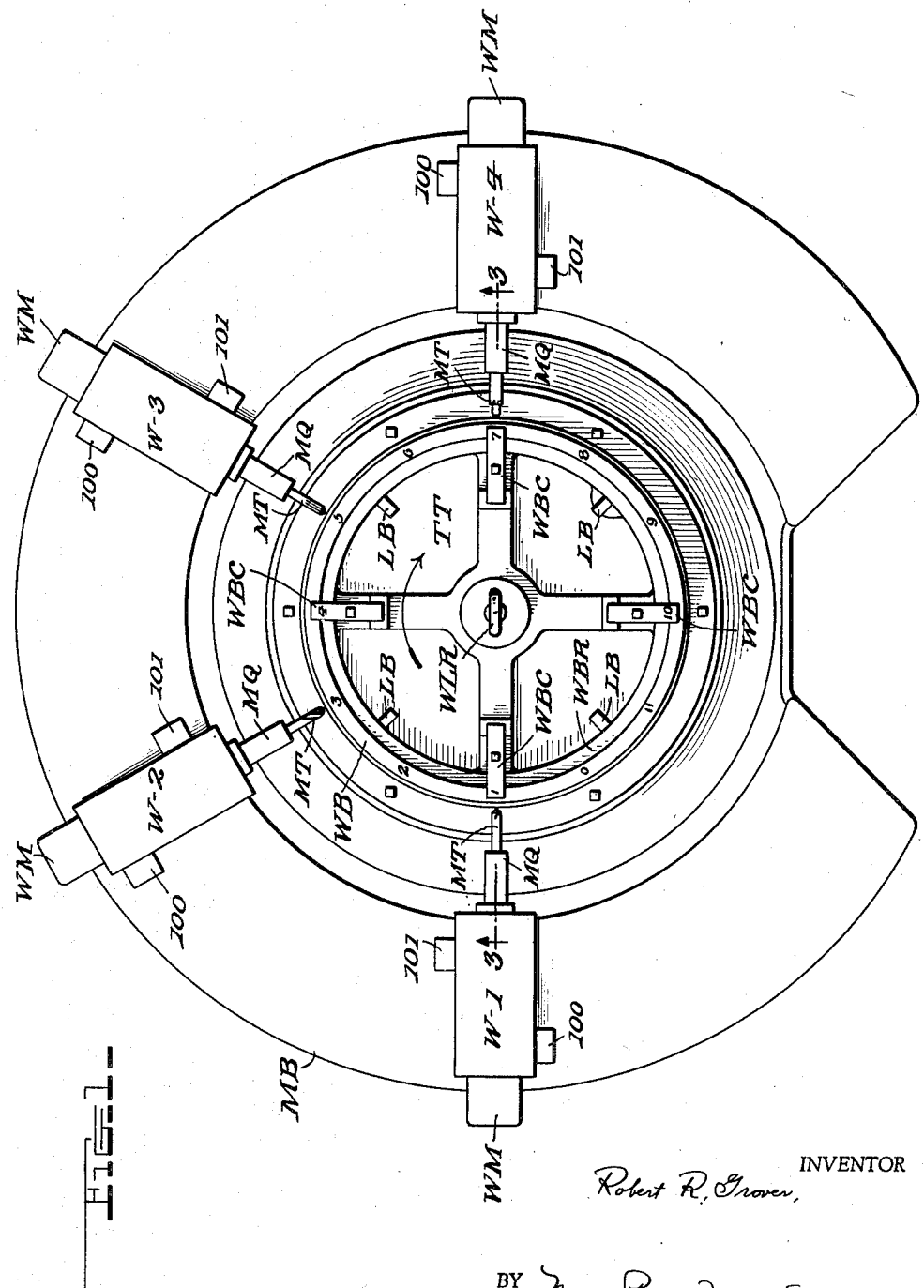

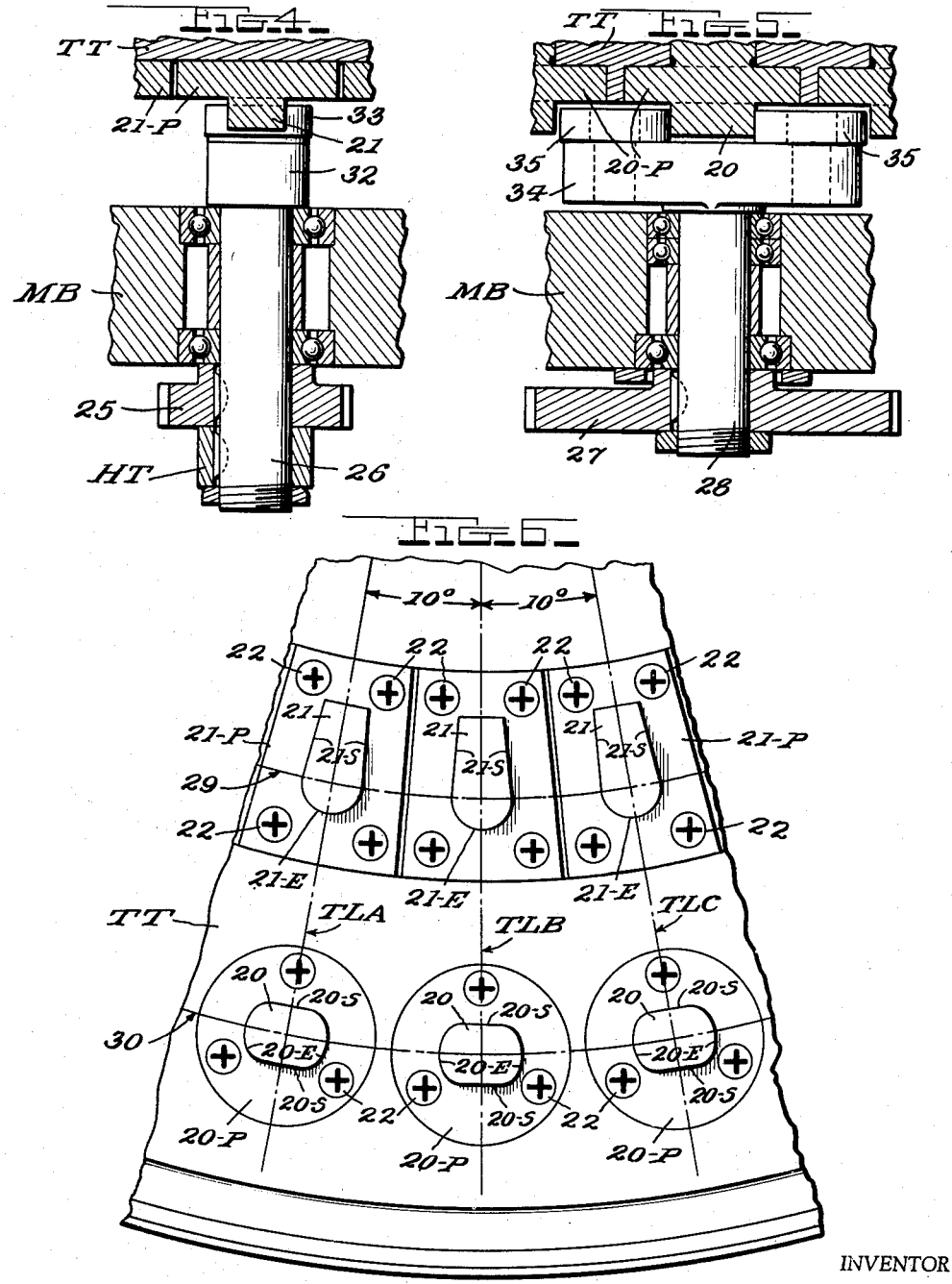

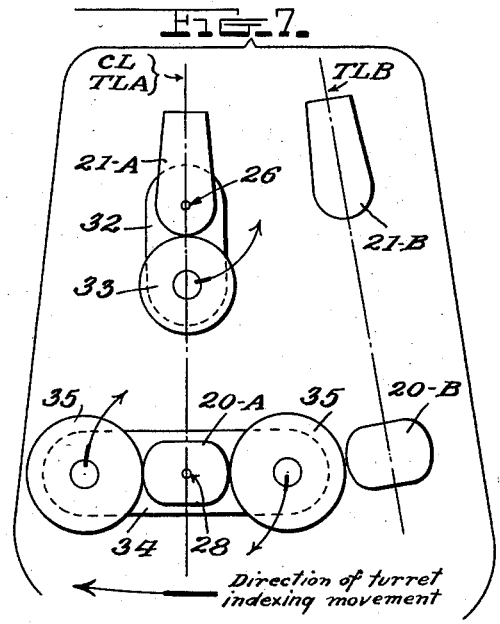
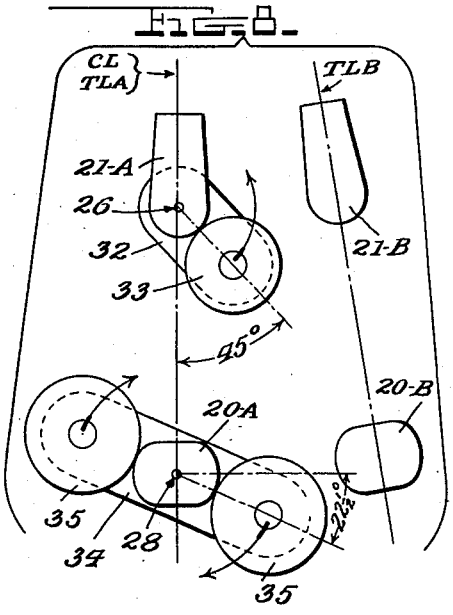
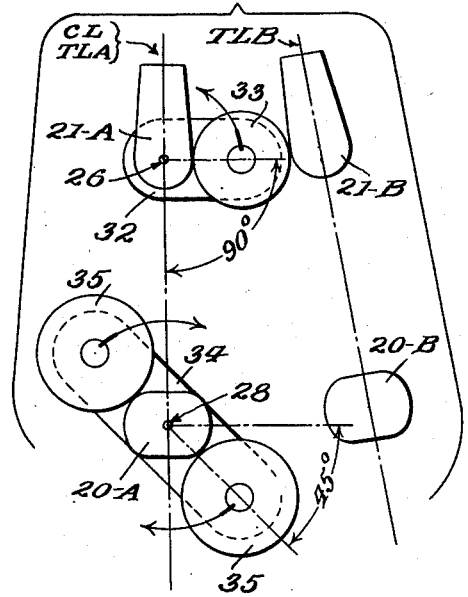
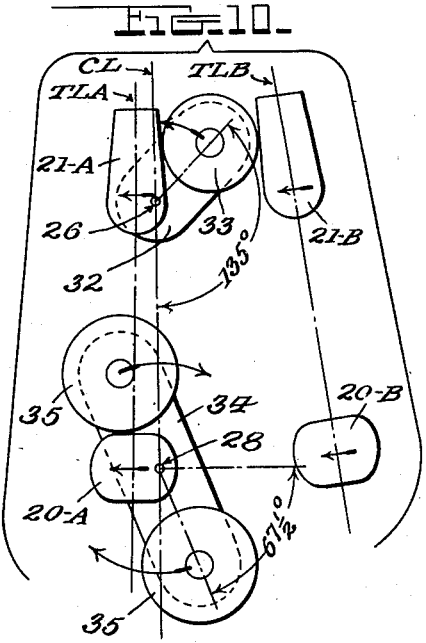

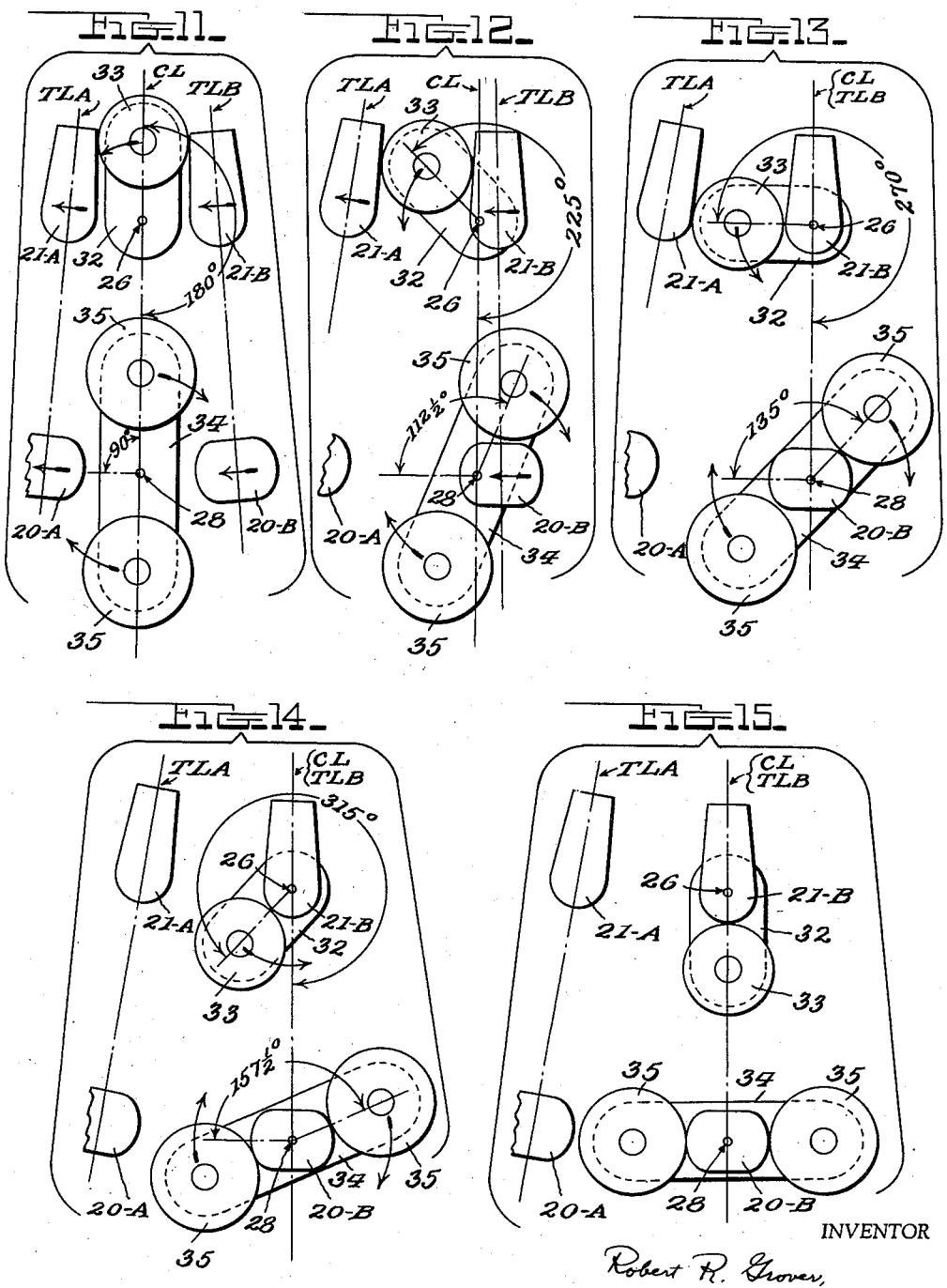

United States Patent Office 2,821,870
Patented Feb. 4, 1958

2,821,870

MULTIPLE INDEXING MACHINE TOOL

Robert R. Grover, Winchester, Westport, N. H., assignor to Kingsbury Machine Tool Corporation, Keene, N. H., a corporation of New Hampshire Application March 3, 1954, Serial No. 413,820

5 Claims. (Cl. 74—820)

This invention relates to improvements in automatic turret-type machine tools, which include a base upon which is mounted a rotatable turret and a plurality of tool units for performing operations upon the work, and in which the turret is rotated by intermittent indexing steps whereby the work is successively presented opposite the tool units.

Such a machine is shown with general parts in the Kingsbury Patents Nos. 1,975,007 and 1,975,008.

The program-controlled combinations set out herein are disclosed and claimed in my copending divisional application Serial No. 488,839, filed February 17, 1955, following requirement for restriction.

One of the features of the present invention is the provision of an indexing mechanism for such a machine in which the turret is held locked during working operations, then unlocked and advanced through an indexing angle, and re-locked, with the inclusion of separate elements for the locking and the indexing operations.

Another feature is the provision of an indexing mechanism for such a machine, in which separate rotatable members are conjointly driven from a driving unit and comprise a first member which turns through 360 degrees at each indexing operation and a second member which turns through 180 degrees at each indexing operation, wherewith at each indexing cycle the first member moves idly while the second member is unlocking the turret, thereafter advances the turret while the second member turns idly, and finally completes its movement idly while the second member is re-locking the turret.

With these and other features as objects in view, as will appear in the following description and claims, an illustrative form of practice is shown on the accompanying drawings, in which:

Fig. 1 is a plan view, on a small scale, of a machine embodying the present invention, in which a turret is indexed through twelve equal angles per rotation, and four successive work operations are to be performed on the work piece at twelve equally spaced points.

Fig. 2 is a side elevation of the machine in Fig. 1, with parts of the base broken away to show internal structures.

Fig. 3 is a vertical section, on an enlarged scale and substantially on line 3—3 of Fig. 1, indicating the relative positions and cooperation of the index mechanism, the turret and the program structure.

Fig. 4 is a vertical section substantially on line 4—4 of Fig. 3.

Fig. 5 is a vertical section substantially on line 5—5 of Fig. 3.

Fig. 6 is a bottom view of a part of the turret table, showing indexing lug structures.

Figs. 7 to 15 are successive diagrammatic views showing the mechanical parts during the course of an indexing operation.

When a turret machine tool is employed to make repetitive articles by successive drilling, reaming, tapping, counterboring, milling and like operations, each effected by a tool unit including a driving motor, an advanceable and retractable member carrying the proper tool, and a feeding mechanism for moving the member, conditions of tolerance demand that the work be properly and accurately positioned for the action of each tool unit in succession, and conditions of economy demand that a minimum time and energy be expended in indexing the turret so that the work is regularly moved past the tool units.

The illustrative form of practice shown in Figs. 1 and 2 is for the production of radial holes in a work piece WB at twelve equally spaced peripheral points, by the four successive operations at each point of spot drilling, drilling, reaming, and counterboring. The machine frame MB supports the four work units W-1, W-2, W-3 and W-4. Each work unit has a motor WM which is constantly running and acting to drive a tool and through a friction clutch to move a feed mechanism except when such mechanism is latched against movement; an individual solenoid shown conventionally at 100 being provided for disengaging the latch so that the feed mechanism can begin operation. Upon energization of the trip solenoid 100, the motor WM causes axial movement of the quill MQ so that the same moves forward a controlled distance to perform an operation by its tool MT and then retreats again into its original position and is relatched. As the feeding system moves the quill MQ, a supervisory switch 101 on the individual unit is immediately opened, and remains open until the quill has returned to its original position, whereupon the switch 101 is closed again. Such work units are known, for example in the aforesaid Kingsbury Patent 1,975,008. In Fig. 1, the work unit W-1 has its quill MQ provided with a spotting drill; the unit W-2 has a drill; the unit W-3 has a reamer; and the unit W-4 has a counterbore.

In the base MB of the machine is located an index drive ID having a motor MID which is constantly turning and endeavoring to move the drive through a friction clutch, but being prevented normally from such action by a latch controlled by the solenoid 65. When this solenoid is energized, the latch is momentarily raised to release the index drive ID, and then the latch at once returns to position for stopping the index drive after it has completed a revolution: if the solenoid is still energized at the completion of such revolution, the solenoid must be de-energized and re-activated before it can again release the latch, so that the single indexing sub-cycle effect is assured even if the circuit to the solenoid is held energized or if such energization for any reason should fail during the course of the sub-cycle, thereby avoiding double-indexing when not desired. Such over-running solenoid-actuated latches are known, and the details thereof form no part of this invention. When this solenoid is energized, the index drive ID proceeds to produce rotation of the turret table TT through one indexing angle, which in the form of Figs. 1 and 2 is 30 degrees, so that twelve indexing movements are required for a full rotation of the turret table TT, and this table comes to rest successively in each of twelve positions. For simplicity of explanation, the initial position 0 is taken as the position immediately ahead of the first operation by the spotting drill at unit W-1, the turret table TT moving in a clockwise direction as shown by the arrow. The successive other positions are shown as 1, 2, 3, . . . 11, noting that a full rotation to the twelfth position brings the turret table TT back to position 0.

The turret table TT has fixture pieces thereon for accurately locating the work WB, which is held in position by ring WBR and the clamps WBC. In Figs. 1 and 2, the work WB is a ring which is to have twelve equally spaced radial holes formed in its rim by a succession at each hole of spot-drilling, drilling, reaming and counterboring operations. In Figs. 1 and 3, the fixture ring WBR is illustrated as having spokes connected at the center to a lift ring WLR whereby the fixture may be lifted from the table TT by a crane, after release, and moved to a work bench and a new fixture ring with a new work blank WB thereon placed in the machine. Thus the work is placed in the fixture with care at the work bench, and its positioning in the machine is by locating blocks LB, followed by securing upon the turret table.

It has likewise been known, e. g. in the aforesaid Kingsbury patent, to have the turret formed with projections which are engaged by parts of the indexing system whereby the turret is held locked during the operation of the tool units, then unlocked and advanced by the indexing drive, and relocked before the tool units begin their new cycle of work.

According to the instant invention, the turret TT is provided with rows of locking lugs 20 and indexing lugs 21, each equal in number to the positions to be occupied by the turret in one rotation of 360 degrees. In the illustrated form, these are provided on the bottom of the turret table TT, Figs. 3–6, by being formed as pieces having securing plates 20–P, 21–P, from which the lugs extend. These plates are positioned in recesses (Fig. 3) in the table bottom. In this illustrated form, pairs of lugs are located along radial lines TLA, TLB, TLC through the turret axis, these lines being angularly spaced by the distance the turret is to be moved during indexing: each lug is symmetrical about its respective symmetry line. The locking lugs 20 have identical lengths in the circumferential direction of the machine, and have arcuate ends 20–E, the arcs being circular about centers at the symmetry lines; the inner and outer surfaces 20–S are flattened, and are joined to the surfaces 20–E by rounded corners. Each indexing lug 21 has a rounded outer end surface 21–E formed as a circular arc about a center on the symmetry line; and flattened sides 21–S which are shown as chordal relative to the turret center wherewith the adjacent sides of each two indexing lugs are parallel. The plates 20–P, 21–P are secured to the turret TT by screws 22.

The main indexing drive ID is connected to rotate the indexing shaft 23 by 360 degrees for each indexing movement in a sub-cycle. The shaft 23 is illustrated as including universal joints so the index drive ID may be located in a desired part of the machine base. Gear 24 on the shaft 23 is in mesh with gear 25 on shaft 26, and gear 25 in turn is in mesh with gear 27 on the shaft 28. Gears 24 and 25 have the same number of teeth so that shaft 26 turns through 360 degrees in the direction of the arrow (in each of Figs. 7–14) for each indexing cycle, while gear 27 has twice as many teeth so that it turns through 180 degrees in each indexing cycle. The axis of shaft 26 intersects the circle 29 (Fig. 6) through the centers of the rounded ends of the indexing lugs 21, i. e. it is in the plane of Fig. 4; and the axis of shaft 28 intersects the circle 30 (Fig. 6) through the centers of the locking lugs 20, i. e. it lies in the plane of Fig. 5.

The shaft 26 carries a crank arm 32 upon which is mounted an indexing roll 33 with its axis parallel but eccentric to the shaft axis: the roll 33 is located in the horizontal plane of the indexing lugs 21 and serves to advance these lugs one for each indexing cycle. The shaft 28 carries a double crank arm 34 upon which is mounted a pair of locking rolls 35 whose axes are parallel to but offset from the shaft axis by equal distances so that the rolls 35 are diametrically opposite one another and in the horizontal plane of the locking lugs 20, the rolls being spaced apart a slightly less distance from the peripheral dimension (i. e. between surfaces 20–E) of the individual locking lugs so that a preliminary resilient tension exists in the parts to avoid looseness or backlash.

The central shaft CS projects below the turret table TT and carries a sprocket 40 having thereon a chain 41 which passes around the driven sprocket 42 on the shaft 43. An adjustable idler sprocket 44 also engages the chain 41 and prevents looseness or backlash in the drive. The shaft 43 includes universal joints for a like purpose to that of the joints in shaft 23, and has its lower end journalled in the housing 45 of a program structure PS. The ratio between the sprockets 40 and 42 is determined by their respective numbers of teeth, and may be selected according to the action desired, such as 1:1, 1:2, 1:4; in the illustrated form, the ratio is 1:2.

The shaft 43 is connected to parts within the housing 45 and under cover 58 of a program structure PS, which serve for controlling the operations of the work units W–1, W–2, W–3, W–4, and the operation of the indexing system, as described and claimed in my divisional application, Ser. No. 488,839 filed February 17, 1955, to which reference is made for a programming system by which successive indexing operations are performed by energization of the solenoid 65 (Fig. 3) upon closure of the switches 101 of the work units (Fig. 1), with each indexing cycle including closure of a switch HT (Figs. 3 and 4) which procures operation of the program system with selective energization of one or more of the solenoids 100 of the work units, whereupon the selected work units effect opening of the switches 101, perform their own cycles, and then close the switches 101 again to initiate a further indexing operation.

In Figs. 7 to 15 are shown the mechanical cooperation of indexing members, during the course of a single indexing movement. In the illustrated form, the parts are symmetrical and the turret may be operated in either direction by reversing the rotation of its drive shaft 23. In these figures, the turret table is assumed removed while leaving the lugs thereon in position for cooperating with the three rollers 33, 35, 35, all parts being shown in outline for simplicity, and with the fixed centers of shafts 26, 28 shown by small circles.

Fig. 7 represents the parts with the turret table locked against peripheral movement and with the intermittently rotating indexing mechanisms in position to start an indexing movement. A radial line CL passes through the centers 26, 28 of the corresponding shafts, and the roller 33 is being presented by the crank arm 32 with the roller axis on line CL, that is, the roller 33 is in line with and opposite a first indexing lug 21–A, being located symmetrically opposite the rounded outer end 21–E (Fig. 6) thereof. The two rollers 35, 35 are positioned by the arm 34 opposite the rounded ends of the locking lug 20–A which forms a pair with the turning lug 21–A, these rollers 35 having a tight grip against the ends of the lug 20–A so that this lug is prevented from any peripheral movement, and correspondingly the turret table is being still held locked against such motion as it was while the work units W–1, W–2, etc., were operating during the final portion of the preceding sub-cycle. The lugs 20–A and 21–A are located on a radial line TLA of the turret table which in Fig. 7 is coincident with the line CL of the machine base.

The next succeeding pair of lugs 20–B and 21–B are also located on a radial line TLB of the turret table, each lug being symmetrical with respect to such line.

In the illustrated form, the rollers 35 are slightly less in diameter than the peripheral spacing distance between lugs 20–A, 20–B: and the spacing between adjacent surfaces of the two rollers 35 is greater than the distance between surfaces 20–S (Fig. 6) of locking lugs 20–A, 20–B, etc. The diameter of roller 33 is somewhat less than the spacing between adjacent surfaces of the indexing lugs 21–A, 21–B, etc.

In Figs. 7 to 15, the turret table is to move in a clockwise direction, wherewith the succession of lugs 21–A, 21–B, etc., is to move in a clockwise direction: with a similar movement of the succession of locking lugs 20–A, 20–B, etc. The roller 33 is carried by its crank arm 32 in a counterclockwise direction about the axis of shaft 26. The rollers 35 are carried in a clockwise direction by their arm 34 about the axis of shaft 28. When the indexing drive unit ID is released by energization of its solenoid 65, the shaft 23 begins to turn, and therewith the crank arms 32, 34 begin to move and carry the rollers 33, 35, 35 in the directions stated and as shown by the arrows.

During the first 45 degrees of movement, into the position of Fig. 8, the rollers 35 travel with pressure along the end surfaces 20-E of lug 20-A, these surfaces being concentric with the center of lug 20-A which in Figs. 7, 8 and 9 is itself coincident with the axis of shaft 28. During the course of this movement, the turret table remains locked against peripheral movement. During this time, also, the roller 33 is passing idly along the outer end of lug 21-A which has a curved surface concentric during this period with the axis of shaft 26.

During the next succeeding movement of 45 degrees of the roller 33 to a total of 90 degrees, it enters between the lug 21-A and the next succeeding lug 21-B: and the corresponding half-angle motion of rollers 35, 35 advance these through a total distance of 45 degrees as shown in Fig. 9, in which they now leave contact with the lug 20-A. That is, in the position of Fig. 9, the locking rollers 35 have ceased to exert locking pressure, and the indexing roller 33 is ready to begin action against a radial side surface of the lug 21-A to effect indexing movement of the turret table TT.

During the next 45 degrees of movement of the roller 33, into the position of Fig. 10, it acts on the lug 21-A to cause a gradual acceleration of movement of this lug and of the turret table: the rollers 35 now being free of the locking lug 20-A. It will be noted in Fig. 10 that the symmetry line TLA through the lugs 20-A, 21-A is no longer coincident with the center line CL of the machine, representing a partial indexing movement of the turret table relative to the machine base.

During the next 45 degrees of movement of the roller 33, into the position of Fig. 11, wherewith the roller 33 has traveled a total of 180 degrees about the axis of shaft 26, the rate of motion of the turret table increases and therewith the line TLA of lugs 20-A, 21-A is moved farther from the machine center line CL, and the lug 20-A has passed from between the rollers 35, which have now moved a total of 90 degrees from the position of Fig. 7.

During the next 45 degrees of movement of the roller 33 about the axis of shaft 26, into the position of Fig. 12, the roller 33 continues to roll and press against the same side of lug 21-A, to move the same but at a decreasing rate as the angle of presentation by the crank arm 32 changes: therewith, the next locking lug 20-B begins to enter between the locking rollers 35.

As the roller 33 completes the next 45 degrees of movement into the position of Fig. 13, it completes its rolling and pressure against the lug 21-A, and the turret table comes gradually to rest from this advancing action by roller 33, overrunning of the turret table TT being prevented as the next lug 21-B is opposite the roller 33 in the successive positions of Figs. 9 to 13: at the same time, in moving to the position of Fig. 13, the locking rollers 35 now advance to a position in which they are about to engage the curved end surfaces 20-E of the next locking lug 20-B, it being noted that the radial symmetry line TLB of lugs 20-B, 21-B has been advanced from the position of Fig. 7 until it is now coincident with the machine center line CL. At this stage, the turret has been roughly advanced by the desired angular distance, i. e. the angle between lines TLA and TLB, but the indexing shaft 23 is continuing to turn.

During the next 45 degrees of movement of the roller 33 into the position of Fig. 14, it moves along the curved outer surface 21-E (Fig. 6) of the lug 21-B without moving the turret table TT: and simultaneously the locking rollers 35 engage the curved ends 20-E of the lug 20-B and begin moving therealong, under the pre-established pressure provided in this roll mounting and by the relative at-rest spacing between adjacent roller surfaces, in comparison to the diameter of these end surfaces 20-E of lug 20-B.

At the succeeding 45 degrees of movement of roller 33, it completes an idle movement along the curved outer surface 21-E of lug 21-B until it has moved through a full 360 degrees about the axis of shaft 26 and is now back in the starting position of Fig. 7. Correspondingly, the rollers 35 have turned through a final 22½ degrees, so that they have completed a movement of 180 degrees from the position of Fig. 7: and are again engaged under pressure with the end surfaces 20-E of the locking lug 20-B and are holding this lug and therewith the turret table TT against peripheral movement and in a position which can be accurately determined by the positioning of the lug 20-B on the bottom of the turret table.

Thus, in the indexing movement of a sub-cycle, as shown by Figs. 7 to 15 inclusive, the roller 33 has moved through 360 degrees about the axis of shaft 26, rolling and pressing against a turning lug 21-A and causing this lug to move through approximately the angular indexing distance for the turret table TT: and simultaneously the pair of locking rollers 35 have turned through an angle of 180 degrees about the axis of shaft 28, detaining the locking lug 20-A until the turning roller 33 is ready to act in a position (Fig. 9) between the lugs 21-A, 21-B, then releasing the lug 20-A (Fig. 10) so that it may move freely as the lug 21-A is driven, with entry of the succeeding locking lug 20-B into position, and followed by an engagement and gripping of the lug 20-B to hold the turret table in the new position. It will be noted that the radial symmetry line TLA of the lugs 20-A, 21-A on the turret table remains coincident with the machine center line CL through the axes of shafts 26, 28, in the positions of Figs. 7, 8 and 9: and that the radial symmetry line TLB of the new lugs 20-B, 21-B is coincident with the center line CL in the positions of Figs. 13, 14 and 15, wherewith the shafts 26, 28 and therewith the drive shaft 23 perform parts of their motion under conditions when the turret table is either positively locked, or is detained against any major displacing movement. Accordingly, the cam HT (Figs. 3 and 4) can turn through a substantial angle, and effect the closing and succeeding reopening of the switch S during passage from the position of Fig. 14 to that of Fig. 15: and correspondingly the work units W-1, W-2 can be started upon closure of the switch S, allowing for relay delay times, without any movement occurring in the turret table even though the index drive ID has not come fully to rest before the work units begin action, wherewith there is saving of total machine time per unit of work produced.

During the next succeeding sub-cycle, the lug 20-B is correspondingly released and the lug 21-B actuated, until a new pair of lugs 20, 21 are brought to the position of lugs 20-B, 21-B in Fig. 15: and this is repeated for each sub-cycle.

I claim:

1. In a machine of the class described, a base, a turret rotatable on the base, first and second sets of lugs on the turret and spaced along two concentric circles relative to the turret axis, first and second rotatable members associated with and positioned opposite the respective lug circles, the first rotatable member having a first element carried in rotation therewith at a fixed distance from the axis of the said first rotatable member for successively engaging a lug of the associated first set and by cooperation with said lug and the next succeeding lug of said first set for effecting a predetermined arcuate movement thereof, the second rotatable member having a pair of elements carried in rotation therewith and positioned opposite one another at fixed like distances from the axis of said second member, said pair of elements being positioned by the second rotatable member for cooperation with the successive lugs of the second set and effective for detaining a said lug of the second set while the said first element is free of the lugs of the first set, the elements of said pair moving respectively inwardly and outwardly relative to the lug circle of said second set of lugs whereby the second lugs can be moved between said pair of elements, said first element being positioned by the first rotatable member to detain said lug and said next succeeding lug while said pair of elements is free of the lugs of the first set, and means for concurrently rotating said rotatable members.

2. In a machine of the class described, a base, a turret rotatable on the base, sets of indexing and locking lugs on the turret and spaced at equal angles along two concentric circles relative to the turret axis, rotatable indexing and locking members having axes substantially parallel to the turret axis and respectively intersecting said circles, each of the indexing lugs having a rounded end symmetrical to a radial plane of the turret axis, said indexing member including a first roller rotatable about an axis substantially parallel to the said axes and carried by the said member during rotation of the latter in a path whereby the roller surface is in contact with the rounded end of an indexing lug during a part of a said rotation and therewith is moved into the space between said indexing lug and the next succeeding indexing lug and thereafter moves out of said space while in contact with the rounded end of the next succeeding lug, the locking lugs being rounded at their peripherally disposed ends, said locking member including a pair of rollers which in locking position engage said rounded peripheral ends and are carried by said locking member in its rotation into positions spaced from on another in a relatively radial direction from the turret axis whereby the locking lugs can move between them, and means for concurrently moving said members.

3. In a machine of the class described, a base, a turret rotatable on the base, equispaced indexing lugs on the turret, each indexing lug having an end rounded about a center lying in a first circle, an equal number of equispaced locking lugs on the turret, each locking lug having a lesser dimension along a radial line of the turret than along a second circle, said circles having centers coincident with the turret axis, each locking lug having end portions curved and symmetrical about a center on said second circle, an indexing member rotatable on the base about an axis intersecting said first circle and having an indexing roller eccentrically journalled thereon to move along the rounded ends of the indexing lugs, a locking member rotatable on the base about an axis intersecting said second circle and at right angles to the plane of said second circle and having a pair of locking rollers journalled opposite one another and at like distances from said last-named axis for engaging while in locking position the said end portions of the locking lugs and while in another position presenting a space for the passage of the locking lugs, and means for concurrently rotating said members so that the indexing roller is engaged with a said rounded end while said locking rollers are engaged with said end portions and the indexing roller is located between two indexing lugs when said locking rollers are in said other position.

4. In a machine of the class described, a base, a work holder movable on the base, first and second sets of lugs on the work holder, first and second rotatable members associated with the respective sets of lugs, driving means for rotating one of said members, and means for connecting said members so that the first member turns at twice the speed of the second member while said driving means is active, the first rotatable member having a first element carried in rotation therewith for successively acting between adjacent lugs of the first set for procuring step by step advancement of the work holder for each revolution of said first rotatable member, the second rotatable member having a pair of second elements carried in rotation therewith for acting successively upon the peripherally spaced ends of a lug of the second set for holding the same and therewith the work holder in successively advanced positions, said connecting means being so constructed and connected that the second member presents the second elements free of the second lugs so that the second lug which has been held can then move between the second elements during the time the first member is actively carrying the first element for movement of the first lugs.

5. In a machine of the class described, a base, a turret rotatable on said base, first and second sets of lugs arranged in concentric circles on said turret, first and second rotatable members on said base, the first rotatable member having thereon a first element carried in rotation therewith and cooperative with the lugs of the first set to perform a cycloidal movement relative thereto by passing from a position between two adjacent first lugs and around an end of one first lug and into position between said one lug and the other lug adjacent thereto, the second rotatable member having thereon a pair of second elements carried in rotation therewith opposite to one another at like distances from the axis of the second rotatable member and cooperative successively with the lugs of the second set, intermittently effective driving means for rotating one said member, and driving means for connecting said members whereby said second member turns at half the speed of said first member, and whereby said pair of second elements are tangentially spaced along the circle of the second set of lugs while said first element is between a pair of lugs of the first set and whereby said pair of second elements are radially spaced relative to the turret axis for movement of a lug of the second set therebetween while said first element is driving a lug of the first set.

References Cited in the file of this patent

UNITED STATES PATENTS

| | | |
|---|---|---|
| 2,381,039 | Churchill | Aug. 7, 1945 |
| 2,389,668 | Johnson | Nov. 27, 1945 |
| 2,464,996 | Schater et al. | Mar. 22, 1949 |

OTHER REFERENCES

Ingenious Mechanisms, etc. (first ed.), Franklin D. Jones, Copyright 1930, the Industrial Press, New York. N. Y., pp. 69, 70, and 100–108, inclusive.